and_ States Patent [19]
Ando

[11] 3,850,402
[45] Nov. 26, 1974

[54] DEVICE FOR ADJUSTING AND FIXING PARTS REQUIRING FINE ADJUSTMENTS, PARTICULARLY PARTS OF AN OPTICAL SYSTEM

[75] Inventor: Tomohiko Ando, Yokohama, Japan
[73] Assignee: Ricoh Co. Ltd., Tokyo, Japan
[22] Filed: Apr. 12, 1973
[21] Appl. No.: 350,362

[30] Foreign Application Priority Data
 Apr. 17, 1972  Japan.............................. 47-37744

[52] U.S. Cl. ............................................. 248/476
[51] Int. Cl. ......................................... F16m 13/00
[58] Field of Search .......... 248/178, 179, 180, 181, 248/274, 466, 468, 479; 269/74

[56] References Cited
UNITED STATES PATENTS

| 605,527 | 6/1898 | Swartz | 248/181 X |
| 1,112,935 | 10/1914 | Rial et al. | 248/180 |
| 3,182,552 | 5/1965 | Andy | 248/466 |
| 3,216,678 | 11/1965 | Foedisch | 248/180 X |

Primary Examiner—William H. Schultz
Attorney, Agent, or Firm—Cooper, Dunham, Clark, Griffin & Moran

[57] ABSTRACT

A device for finely adjusting and fixing a part with respect to a supporting body such as an optical system comprising a plurality of adjusting nuts, each partially formed with a spherical surface and threadably mounted on a respective stud secured to the supporting body with the spherical surface maintained in contact with a stud receiving matching conical recess formed in the surface of the part to be adjusted closest to the supporting body so that the adjusting nuts function as positioning means for the part; a plurality of spacers each formed with a straight edge and also mounted on one of the studs with the straight edge in contact with the remote surface of the part to be adjusted; a plurality of springs mounted on the studs and acting on the spacers to maintain their straight edges in contact with the remote surface of the part; and a plurality of fixing nuts, each threadably engaging one of the studs and formed with a recess for receiving a spring therein so that the fixing nut may be brought into contact with the spacer to exert a clamping force on the part to be adjusted with the spring enclosed entirely in the recess. Modifications of the spacer include forming straight edges on opposite sides thereof disposed at right angles to each other and offsetting the straight edge from the center line of the stud-accomodating opening therein.

4 Claims, 7 Drawing Figures

3,850,402

DEVICE FOR ADJUSTING AND FIXING PARTS REQUIRING FINE ADJUSTMENTS, PARTICULARLY PARTS OF AN OPTICAL SYSTEM

BACKGROUND OF THE INVENTION

This invention relates to a device for adjusting and fixing parts requiring fine adjustments, particularly parts of an optical system.

Hitherto, it has been customary to effect fine adjustments of a support plate for a part of an optical system, for example, by using a combination of nuts and springs. However, this adjusting and fixing means lacks stability. The object of this invention is to obviate this disadvantage of the prior art.

SUMMARY OF THE INVENTION

The invention resides in the provision of a device for adjusting and fixing parts requiring fine adjustments, particularly parts of an optical system, comprising: a plurality of studs secured to a main body and each adapted to extend through openings formed in a part to be adjusted and fixed with respect to the main body; a plurality of adjusting nuts each being formed with a spherical surface and threadably engaging one of said studs on one side of the part to be adjusted, with the spherical surface being maintained in contact with a conical recess formed in the part so that the adjusting nuts function as positioning means for the part to be adjusted and fixed; a plurality of spacers each being formed with a straight edge and mounted on one of the studs on the other side of the part to be adjusted with the straight edge in contact with the part; a plurality of springs each mounted on one of the studs and acting on one of the spacers so that each spacer can be brought into adjustment and fixed and the part also can be brought into contact with the adjusting nut; and a plurality of fixing nuts each threadably engaging one of the studs and supporting one end of the spring so as to fix and exert a clamping force on the device.

BRIEF DESCRIPTION OF THE DRAWINGS

Additional features and advantages of the invention will become evident from the description of the adjusting and fixing device according to the invention set forth hereinafter in comparison with a conventional adjusting and fixing device for the spherical mirror of a facsimile transmitter when considered in conjunction with the accompanying drawings, in which.

DETAILED DESCRIPTION OF THE INVENTION

Figure 1:
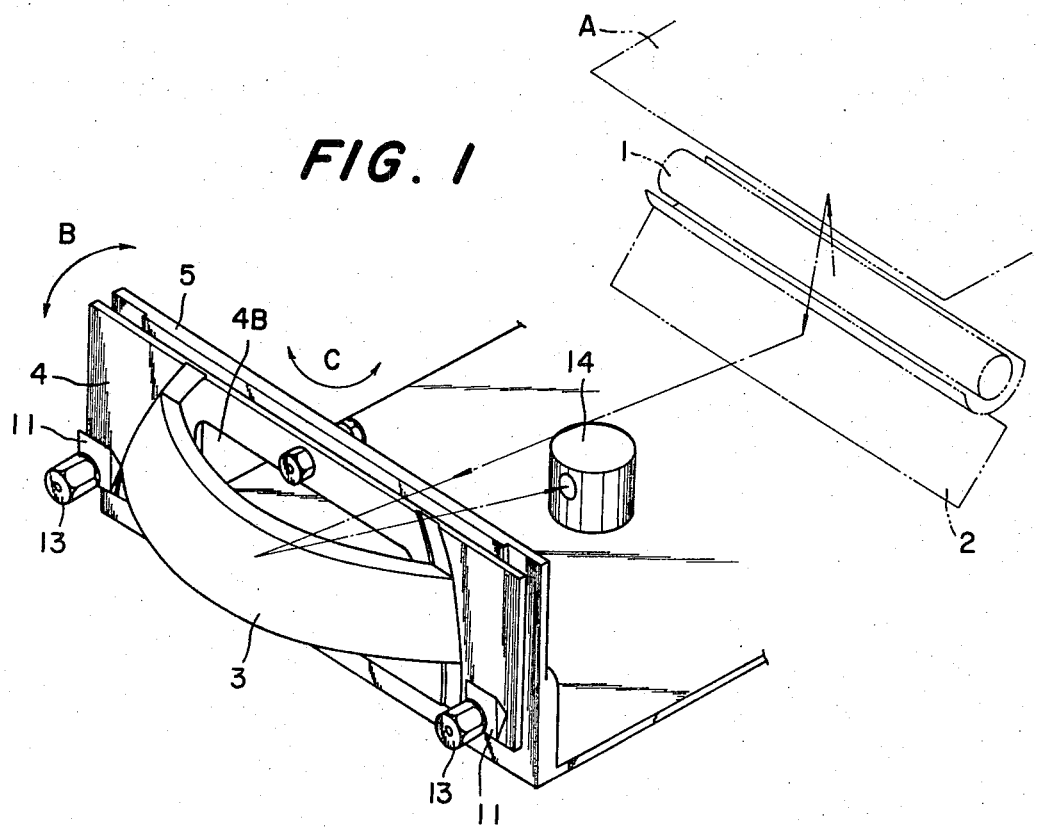
FIG. 1 is a perspective view of a spherical mirror support plate mounted on a main body by adjusting and fixing the former to the latter with the device according to the invention.

In FIG. 1, there is shown a spherical mirror 3 firmly fixed to a main body 5 in a suitable position. The light emanating from a light source 1 and reflected by an original A is again reflected by a mirror 2 and reaches the spherical mirror 3. The light is reflected by the spherical mirror 3 and incident on light receiving means 14 by which it is converted into a photocurrent. The support plate 4 is formed therein with mounting openings 4A (FIG. 2) and an opening 4B for the incident light and reflected light to move therethrough.

Figure 2:
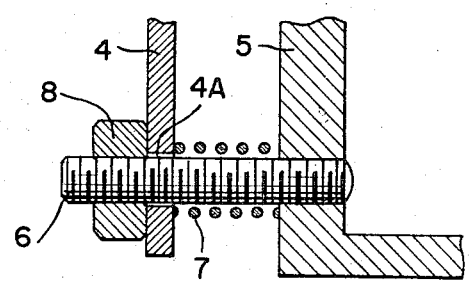
FIG. 2 is a view in explanation of a conventional adjusting and fixing device.

In a conventional adjusting and fixing device shown in FIG. 2, a suitable number of studs 6 are planted on the main body 5, and the spherical mirror supporter 4 is mounted on the studs 6 by inserting the studs in the mounting openings 4A formed in the plate 4. Positioning of the support plate 4 is effected by springs 7 each mounted on one of the studs 6 and interposed between the main body 5 and support plate 4, and by nuts 8 each threadably fitted over one of the studs 6 and disposed opposite the spring 7 with respect to the support plate 4. After the position of the support plate 4 is adjusted, the threaded portion of each nut 8 is adhesively bonded to the stud in many cases.

When the spherical mirror support plate is fixed by the aforementioned adjusting and fixing device, the device ensures that the support plate 4 is correctly positioned with respect to the nuts 8. However, positioning of the plate 4 with respect to the spring 7 cannot be effected reliably. Thus this adjusting and fixing means is unstable. Moreover, since there is inevitably a gap between the stud 6 and the opening 4A, the support plate 4 is given room for play on the stud 6 when the latter is inserted in the opening 4A in the former. This is a disadvantage for an adjusting and fixing device which must be capable of effecting fine adjustments.

This invention obviates the aforementioned disadvantages of the conventional adjusting and fixing device relying on the combination of nuts and springs. One embodiment of the invention will be described with reference to FIG. 1 to FIG. 3.

Figure 3:
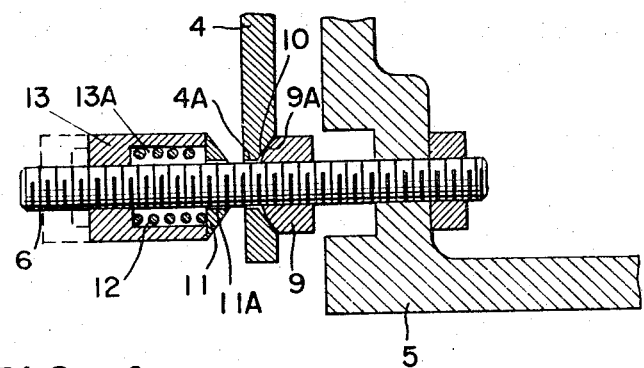
FIG. 3 is a sectional view of the adjusting and fixing device according to the invention.

In FIG. 3, an adjusting nut 9 formed with a spherical surface 9A threadably engages the stud 6 and is disposed on an inner side of the spherical mirror support plate 4. The mounting opening 4A formed in the support plate 4 is formed with a conical recessed surface 10 which is juxtaposed to the spherical surface 9A of the adjusting nut 9, so that the adjusting nut 9 and the support plate 4 can be maintained in line contact with each other.

Figure 4:
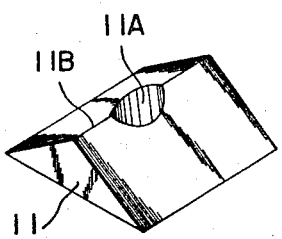
FIG. 4 is a perspective view of one of the spacers used in the invention.

A spacer 11 formed therein with an opening 11A is mounted on the stud 6 and disposed on an outer side of the support plate 4, the stud extending through the opening 11A. The spacer 11 is further formed, as shown in FIG. 4, with a straight edge 11B which is adapted to be brought into contact with the surface of the support plate 4. The spacer 11 has a planar surface disposed on the opposite side of the straight edge 11B. A spring 12 is mounted on the stud 6 and has one end which engages the planar surface of the spacer 11 and the other end which is received in a recess 13A formed in a fixing nut 13 threadably engaging the stud 6.

The manner in which the spherical mirror support plate is adjusted and fixed by the adjusting and fixing device constructed as aforementioned will now be described. It is to be understood that the device comprises a plurality of studs and other elements associated therewith for adjusting and fixing the spherical mirror support plate to the main body. The studs and other elements are similar to one another in construction and operation, so that description of the manner in which adjusting and fixing is effected will be described with respect to one stud.

In FIG. 3, the fixing nut 13 is shown in dotted lines in a position in which it is not tightened yet. When the fixing nut 13 is in this position, the adjusting nut 9 can be rotated to effect adjustments of the position of the spherical mirror support plate 4. At this time, the spacer 11 is maintained in pressing engagement with the support plate 4 by the biasing force of spring 12 so as to thereby maintain the support plate 4 in contact with the adjusting nut 9. When the proper adjustment position is reached then the fixing nut 13 is tightened as shown in solid lines of the nut 13 in FIG. 3 to fix the other elements of the device. The adjustment nut 9 and fixing nut 13 function as a double nut and prevent loosening of the elements of the device.

When it is desired to adjust the support plate 4 about its horizontal axis (in the direction B) in FIG. 1, the spacer 11 is arranged such that its straight edge 11B is disposed horizontally as shown in FIG. 1, and when it is desired to adjust the support plate 4 about its vertical axis (in the direction C), the straight edge 11B is disposed vertically. When it is desired to effect adjustments in other directions, the spacer 11 is arranged such that its straight edge 11B is disposed parallel to the axis about which the support plate 4 is moved for adjustment. By this arrangement, only a force in the axial direction of the stud 6 can be exerted on the support plate 4 after the fixing nut 13 is tightened, so that the production of a force couple can be prevented and the optical system can be made free of distortion. This is also conducive to prevention of misalignment of the spherical mirror support plate after effecting adjustments.

In FIG. 1, the adjustable fixing device according to the invention is shown as being used in the adjusting positions at opposite sides of the plate, and a conventional device is shown as being used in the center adjusting position. This is because the support plate can be fixed satisfactorily if adjustments are effected in the two side positions shown.

Figure 5:
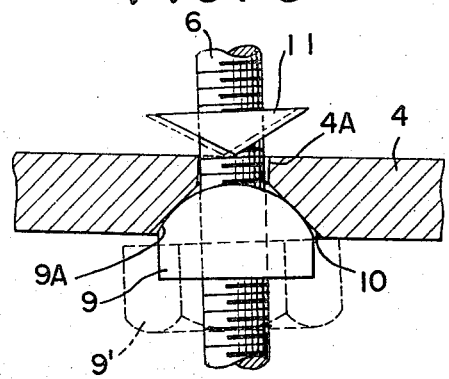
FIG. 5 is a view in explanation of mounting the spherical mirror supporter on the main body in an inclined position.

If an adjusting nut is conventionally constructed such that it is maintained in flat surface contact with the support plate 4, then as shown in a broken line position at 9' in FIG. 5, the adjusting nut 9' and the support plate 4 will be brought into point contact with each other when the support plate 4 is fixed in an inclined position with respect to the main body 5 or stud 5. Thus a force couple will be produced in the support plate 4 and have adverse effects on the parts of the optical system.

According to the invention, the spherical surface 9A of the adjusting nut 9 and the conical recess 4A formed in the support plate 4 are maintained in line contact with each other for a wide range even if the support plate 4 and the stud 6 are inclined with respect to each other. This is effective to prevent the production of a force couple.

Figure 6:
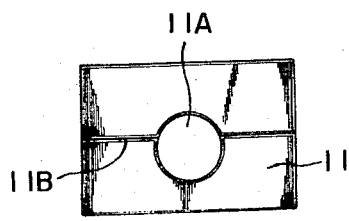
FIG. 6 is a plan view of an eccentric spacer.

When the support plate 4 is inclined greatly with respect to the stud 6, the position in which the straight edge 11B of the spacer 11 is in contact with the support plate 4 will be brought out of alignment with the central portion of the line contact position of the adjusting nut 9 and the support plate 4, as shown in dotted lines in FIG. 5. This misalignment may produce a force couple. In order to preclude this phenomenon, the straight edge 11B of the spacer 11 may be disposed eccentrically with respect to the opening 11A, as is shown in FIG. 6. If a spacer constructed in this manner is employed, it will be possible to bring the position in which the straight edge 11B of spacer 11 is in contact with the support plate 4 substantially into index with the central portion of the line contact position of the adjusting nut 9 and the support plate 4 (as shown in solid lines in FIG. 5), thereby precluding the production of a force couple.

Figure 7:
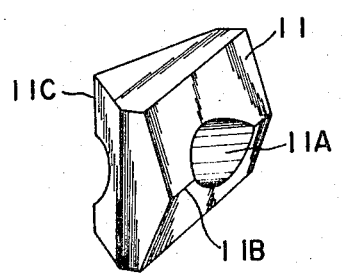
FIG. 7 is a perspective view of another modification of the spacers.

In FIG. 7, there is shown a spacer 11 which is formed on opposite sides thereof with two straight edges 11B and 11C which are disposed at right angles to each other. In this case, the spacer 11 is maintained in contact with the spherical mirror support plate 4 at the straight edge 11B, and in contact with the fixing nut 13 at the straight edge 11C, when the fixing nut 13 is tightened. Thus the spacer 11 and the fixing nut 13 are maintained in line contact with each other, thereby preventing the production of distortion between them.

From the foregoing description, it will be appreciated that the adjusting and fixing device according to the invention is stable because the part to be adjusted and fixed is clamped in opposite directions axially of the stud. The invention is effective to prevent the production of a force couple even when the part to be adjusted and fixed is fixed in an inclined position with respect to the main body or the stud, thereby precluding adverse effect on the parts of the optical system.

It is to be understood that the invention can have application in adjusting and fixing of other parts of the lens system and parts of any system requiring fine adjustments, in addition to the spherical mirror support plate as described.

What is claimed is:

1. A device for adjusting and fixing a part requiring fine adjustment with respect to a main body, such as in an optical system, comprising:

a. a plurality of studs secured to the main body and each adapted to extend through matching openings formed in the part to be adjusted;
   b. a plurality of adjusting nuts, each partially formed with a spherical surface and threadably engaging one of said studs on one side of the part to be adjusted with the spherical surface maintained in contact with a conical recess formed in the part to be adjusted so that said adjusting nuts function as positioning means for the part to be adjusted;
   c. a plurality of spacers, each formed with a straight edge and mounted on one of said studs on the other side of the part to be adjusted with the straight edge in contact with the surface of the part to be adjusted;
   d. a plurality of springs, each mounted on one of said studs and acting on one of said spacers so that each spacer is maintained in contact with the surface of the part to be adjusted; and
   e. a plurality of fixing nuts each threadably engaging one of said studs and supporting one end of said springs so as to fix and exert a clamping force on the device.

2. A device according to claim 1 wherein each said fixing nut is formed with a recess for receiving the spring therein whereby said fixing nut may be brought into contact with the spacer to exert a clamping force thereon with the spring being enclosed in said recesses in its entirety.

3. A device according to claim 1 wherein each said spacer is formed on opposite sides with straight edges disposed at right angles to each other, whereby the spacer can be maintained in line contact with the part to be adjusted and with the fixing nut when the latter is tightened.

4. A device according to claim 1 wherein each said spacer is formed with its straight edge offset from the centerline of the stud-accomodating opening therein.

* * * * *